(12) United States Patent
Takamura et al.

(10) Patent No.: US 8,602,139 B2
(45) Date of Patent: Dec. 10, 2013

(54) BATTERY MOUNTING STRUCTURE FOR SADDLE-TYPE ELECTRIC VEHICLES

(75) Inventors: Toshiaki Takamura, Wako (JP); Atsushi Yonehana, Wako (JP); Hideo Amino, Wako (JP); Yusuke Funayose, Wako (JP); Masao Yoshinaga, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 59 days.

(21) Appl. No.: 13/421,447

(22) Filed: Mar. 15, 2012

(65) Prior Publication Data
US 2012/0234615 A1 Sep. 20, 2012

(30) Foreign Application Priority Data

Mar. 15, 2011 (JP) ................. 2011-056884

(51) Int. Cl.
*B62M 6/90* (2010.01)
*B62M 6/40* (2010.01)

(52) U.S. Cl.
USPC .......... 180/65.1; 180/68.5; 180/220; 180/223

(58) Field of Classification Search
USPC ................. 180/220, 223, 65.1, 68.5
See application file for complete search history.

(56) References Cited

U.S. PATENT DOCUMENTS

| | | | | |
|---|---|---|---|---|
| 5,613,569 A * | 3/1997 | Sugioka et al. | ........ | 180/68.5 |
| 5,657,830 A * | 8/1997 | Kawashima et al. | ........ | 180/220 |
| 6,324,464 B1 * | 11/2001 | Lee et al. | ........ | 701/93 |
| 7,096,984 B2 * | 8/2006 | Ono et al. | ........ | 180/65.1 |
| 7,117,966 B2 * | 10/2006 | Kohda et al. | ........ | 180/68.5 |
| 7,210,548 B2 * | 5/2007 | Yonehana et al. | ........ | 180/68.5 |
| 7,210,550 B2 * | 5/2007 | Yonehana et al. | ........ | 180/220 |
| 7,267,190 B2 * | 9/2007 | Hirano | ........ | 180/65.1 |
| 7,730,985 B2 * | 6/2010 | Oohashi | ........ | 180/68.5 |
| 8,002,067 B2 * | 8/2011 | Nishiura et al. | ........ | 180/220 |
| 8,316,976 B2 * | 11/2012 | Johnson et al. | ........ | 180/68.5 |
| 8,376,075 B2 * | 2/2013 | Sasage et al. | ........ | 180/68.5 |
| 8,418,795 B2 * | 4/2013 | Sasage et al. | ........ | 180/220 |
| 8,453,782 B2 * | 6/2013 | Kondo et al. | ........ | 180/291 |
| 2005/0092538 A1 * | 5/2005 | Baldwin et al. | ........ | 180/220 |
| 2005/0155802 A1 * | 7/2005 | Hirano | ........ | 180/65.1 |
| 2005/0177285 A1 * | 8/2005 | Honda | ........ | 701/22 |
| 2005/0217910 A1 * | 10/2005 | Yonehana et al. | ........ | 180/68.5 |
| 2010/0078246 A1 * | 4/2010 | Sasage et al. | ........ | 180/220 |

(Continued)

FOREIGN PATENT DOCUMENTS

JP 3592755 B2 9/2004

*Primary Examiner* — Jeffrey J Restifo
*Assistant Examiner* — Erez Gurari
(74) *Attorney, Agent, or Firm* — Birch, Stewart, Kolasch & Birch, LLP

(57) ABSTRACT

A battery mounting structure for use on saddle-type electric vehicles which contributes to an increase in the rigidity of a vehicle body frame and attempts to achieve an increased battery carrying capability. Each of battery modules is in the form of a quadrangular prism having long sides and short sides as viewed in plan and vertical sides longer than the long sides. A vehicle frame includes a bulging region in which each of main frames bulges outwardly from a head pipe as viewed in plan and a narrow region in which the distance between the main frames is reduced behind the bulging region. The battery modules include battery modules whose long sides extend along transverse directions of the vehicle in the bulging region and battery modules whose long sides extend along longitudinal directions of the vehicle in the narrow region.

20 Claims, 12 Drawing Sheets

(56) References Cited

U.S. PATENT DOCUMENTS

| | | |
|---|---|---|
| 2010/0078247 A1* | 4/2010 | Sasage et al. ............... 180/220 |
| 2010/0078249 A1* | 4/2010 | Nishiura et al. ............ 180/220 |
| 2010/0078251 A1* | 4/2010 | Nishiura et al. ............ 180/229 |
| 2010/0163326 A1* | 7/2010 | Takamura et al. .......... 180/68.5 |
| 2011/0061960 A1* | 3/2011 | Matsuoka et al. ........... 180/220 |
| 2011/0139531 A1* | 6/2011 | Kanno et al. ................. 180/220 |
| 2011/0177371 A1* | 7/2011 | Belton ........................... 429/98 |
| 2012/0103706 A1* | 5/2012 | Kondo et al. ................ 180/65.1 |
| 2012/0103716 A1* | 5/2012 | Fujihara et al. .............. 180/220 |
| 2012/0193155 A1* | 8/2012 | Hasegawa et al. .......... 180/65.1 |
| 2012/0234615 A1* | 9/2012 | Takamura et al. .......... 180/68.5 |
| 2013/0161108 A1* | 6/2013 | Watanabe et al. ........... 180/220 |

* cited by examiner

US 8,602,139 B2

BATTERY MOUNTING STRUCTURE FOR SADDLE-TYPE ELECTRIC VEHICLES

CROSS-REFERENCE TO RELATED APPLICATIONS

The present application claims priority under 35 USC 119 to Japanese Patent Application No. 2011-056884 filed Mar. 15, 2011 the entire contents of which are hereby incorporated by reference.

FIELD OF THE INVENTION

The present invention relates to a battery mounting structure for use on saddle-type electric vehicles such as electric two-wheeled vehicles or the like.

DESCRIPTION OF BACKGROUND ART

An electric two-wheeled vehicles are known that are propelled by a motor that is energized by electric power supplied from a battery.

For example, Japanese Patent No. 3592755 makes an attempt on an electric scooter to increase its battery carrying capability for increased travelling performance (increased traveling distance) by changing the directions in which a plurality of batteries are carried with respect to each other.

The batteries described above are merely disposed according to the dimension of the frame of the scooter in the widthwise direction thereof, and have not taken into account any ideas about increasing the rigidity of the frame and achieving the ease with which to place electric wires. In view of the present trend toward more freedom for the mounting of batteries due to smaller battery sizes in recent years, scooters have been required to have better battery mounting structures. In particular, sports-type motorcycles find it important to have frame rigidity in the vicinity of a head pipe and are needed to mount a number of batteries to meet higher output requirements. Considerations and ideas for such needs are important points to pay attention to.

SUMMARY AND OBJECTS OF THE INVENTION

It is an object of an embodiment of the present invention to provide a battery mounting structure for use on saddle-type electric vehicles which contributes to an increase in the rigidity of a vehicle body frame and attempts to achieve an increased battery carrying capability.

According to an embodiment of the present invention, a battery mounting structure in a saddle-type electric vehicle which includes a twin-tube frame (11) having a pair of left and right main frames (13) extending rearwardly from a head pipe (12), a propulsive battery (2) including a plurality of battery modules (17a through 17j), and a motor (3) which is energized by electric power supplied from the propulsive battery (2), wherein each of the battery modules (17a through 17j) is in the form of a quadrangular prism having long sides (B) and short sides (T) as viewed in plan and vertical sides (H) longer than the long sides (B). The twin-tube frame (11) includes a bulging region (E) in which each of the main frames (13) bulges outwardly from the head pipe (12) as viewed in plan and a narrow region (F) in which the distance between the main frames (13) is reduced behind the bulging region (E). The battery modules (17a through 17j) include battery modules whose long sides (B) extend along transverse directions of the vehicle in the bulging region (E) and battery modules whose long sides (B) extend along longitudinal directions of the vehicle in the narrow region (F).

The saddle-type electric vehicle covers all vehicles that the rider can sit astride, including not only two-wheeled vehicles (including scooter-type vehicles), but also three-wheeled vehicles (including vehicles with a single front wheel and two rear wheels and vehicles with two front wheels and a single rear wheel) and four-wheeled vehicles.

According to an embodiment of the present invention, the propulsive battery (2) is disposed so as to extend vertically across the main frames (13) as viewed in side elevation.

According to an embodiment of the present invention, the battery mounting structure further includes a battery case (18) housing the propulsive battery (2) therein and a vehicle body cover (23) covering outside the battery case (18) to serve as part of the appearance of the vehicle. In the battery mounting structure, the battery module (17a) positioned in a front end portion of the bulging region (E), among the battery modules (17a through 17g) disposed in the bulging region (E), has a height smaller than the battery modules (17b through 17g) positioned therebehind.

According to an embodiment of the present invention, the battery mounting structure further includes a battery case (18) housing the propulsive battery (2) therein and a vehicle body cover (23) covering the outside the battery case (18) to serve as part of the appearance of the vehicle. In the battery mounting structure, the battery module (17a) positioned in a front end portion of the bulging region (E), among the battery modules (17a through 17g) disposed in the bulging region (E), is fewer than the battery modules (17b through 17g) positioned therebehind which are arranged in a transverse array.

According to an embodiment of the present invention, the battery mounting structure further includes a battery case (18) housing the propulsive battery (2) therein, a motor case (38) housing the motor (3) therein, battery support stays (18c) extending downwardly from a lower surface of the battery case (18), and motor front bosses (35) on the motor case (38). In the battery mounting structure, the motor case (38) is disposed in a region surrounded by the twin-tube frame (11) below the battery case (18), and the battery support stays (18c) and the motor support bosses (35) are coaxially supported by mounts (13a) of the twin-tube frame (11).

According to an embodiment of the present invention, each of the battery modules (17a through 17j) has a beveled surface (20b) on one of a pair of corners along the short sides (T) on the upper end thereof, the battery modules (17a through 17g) disposed in the bulging region (E) include battery modules arranged in at least a transverse pair, and the beveled surfaces (20b) of the battery modules arranged in the transverse pair are disposed outwardly on an upper end of the propulsive battery (2) in the transverse directions of the vehicle.

According to an embodiment of the present invention, the battery modules (17a through 17g) disposed in the bulging region (E) include battery modules (17b through 17g) which are arranged in transverse pairs and have respective positive terminals (19a) disposed on an upper end of the propulsive battery (2) outwardly in the transverse directions of the vehicle.

According to an embodiment of the present invention, the battery modules (17h through 17j) disposed in the narrow region (F) have respective positive terminals (19a) disposed on a rear side of the propulsive battery (2) in the longitudinal directions thereof.

According to an embodiment of the present invention, the battery modules (17a through 17j) are divided into a first battery pack (2a) which includes the battery modules (17b through 17d) disposed in one side of the bulging region (E) in the transverse directions of the vehicle, and a second battery pack (2b) which includes the battery modules (17e through 17g) disposed in another side of the bulging region (E) in the transverse directions of the vehicle, the first battery pack (2a) and the second battery pack (2b) being disposed parallel to each other, and the first and second battery packs (2a, 2b) have positive output terminals (19AL, 19AR) disposed on front sides thereof in the longitudinal directions thereof and negative output terminals (19BL, 19BR) disposed on rear sides thereof in the longitudinal directions thereof.

In the first battery pack (2a), the battery module (17d) which is positioned in the one side of the rear end portion of the bulging region (E) in the transverse directions of the vehicle has a negative terminal (19b) connected to the positive terminal (19a) of the battery module (17h), among the battery modules (17h through 17j) disposed in a transverse array in the narrow region (F), positioned on an outermost side in the one side of the rear end portion of the narrow region (F) in the transverse directions of the vehicle.

In the second battery pack (2b), the battery module (17g) which is positioned in the other side of the rear end portion of the bulging region (E) in the transverse directions of the vehicle has a negative terminal (19b) connected to the positive terminal (19a) of the battery module (17j), among the battery modules (17h through 17j) disposed in the transverse array in the narrow region (F), positioned on an outermost side in the other side of the rear end portion of the narrow region (F) in the transverse directions of the vehicle.

According to an embodiment of the present invention, the motor (3) has a drive shaft (39) extending along the transverse directions of the vehicle and is disposed below the propulsive battery (2), and the battery modules (17a through 17g) disposed in the bulging region (E) are disposed forwardly of a drive shaft central axis (C1) of the motor (3) as viewed in plan, and the battery modules (17h through 17j) disposed in the narrow region (F) are disposed rearwardly of the drive shaft central axis (C1) of the motor (3) as viewed in plan.

According to an embodiment of the present invention, in the bulging region whose rigidity is more difficult to achieve than the narrow region in a frame structure for sports-type motorcycles such as a twin-tube frame, some of the battery modules are arranged with their long sides oriented along the transverse directions of the vehicle (extending between the left and right main frames). Therefore, those battery modules also function as rigid members of the twin tube frame, thereby increasing the rigidity of the vehicle frame as a battery mounting structure for a sports-type motorcycle. In addition, the battery modules which are arrayed along the transverse directions of the vehicle are also arrayed along the longitudinal directions of the vehicle, resulting in an improved battery carrying capability.

In the narrow region of the twin-tube frame, some of the battery modules are arranged with their long sides oriented along the longitudinal directions of the vehicle, making it possible to adjust the number of battery modules carried depending on the narrow region. Therefore, the battery carrying capability can further be improved, and the total width of the narrow region is reduced to allow the rider of the vehicle to easily exert a knee grip. It is thus possible to design a saddle-type electric vehicle having a vehicle frame suitable for sports driving of sports-type motorcycles.

According to an embodiment of the present invention, the vehicle is allowed to mount the propulsive battery which is large in size and capacity.

According to an embodiment of the present invention, the vehicle cover may be curved with a front end portion thereof at a reduced height. Thus, a round shape for a better appearance may be provided.

According to an embodiment of the present invention, the vehicle cover may be curved with a front end portion thereof at a reduced transverse width. Thus, a round shape for a better appearance may be provided.

According to an embodiment of the present invention, the battery case and the motor case can be assembled with ease as they are coaxially supported.

According to an embodiment of the present invention, in the bulging region, the beveled surfaces of the battery modules in the transverse array provide beveled surfaces on outer corners of the upper end of the propulsive battery in the transverse directions of the vehicle. Thus, the vehicle body cover covering the propulsive battery may be given a round shape for a better appearance.

According to an embodiment of the present invention, the positive terminals of the battery modules disposed in the bulging region can easily be recognized, and are arranged for ease with which to connect wires to the positive terminals.

According to an embodiment of the present invention, the positive terminals of the battery modules disposed in the narrow region can easily be recognized, and are arranged for ease with which to connect wires to the positive terminals.

According to an embodiment of the present invention, the negative terminals on the front side in the longitudinal directions of the battery modules that are disposed on the outermost sides of the narrow region may serve as the negative output terminals of the battery packs, for easy connection to electric components disposed centrally in the vehicle body of the vehicle.

According to an embodiment of the present invention, the weight of the propulsive battery is appropriately distributed forwardly and rearwardly of the drive shaft central axis of the motor.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

An exemplary embodiment of the invention will be described below with reference to the drawings. In the description which follows, the terms "front," "rear," "left," "right," and other similar directional expressions represent directions identical to the directions used with respect to a vehicle to be described below unless otherwise noted. The drawings which accompany the description contain the arrow FR indicating a forward direction of the vehicle, the arrow LH indicating a leftward direction of the vehicle, and the arrow UP indicating an upward direction of the vehicle.

Figure 1:
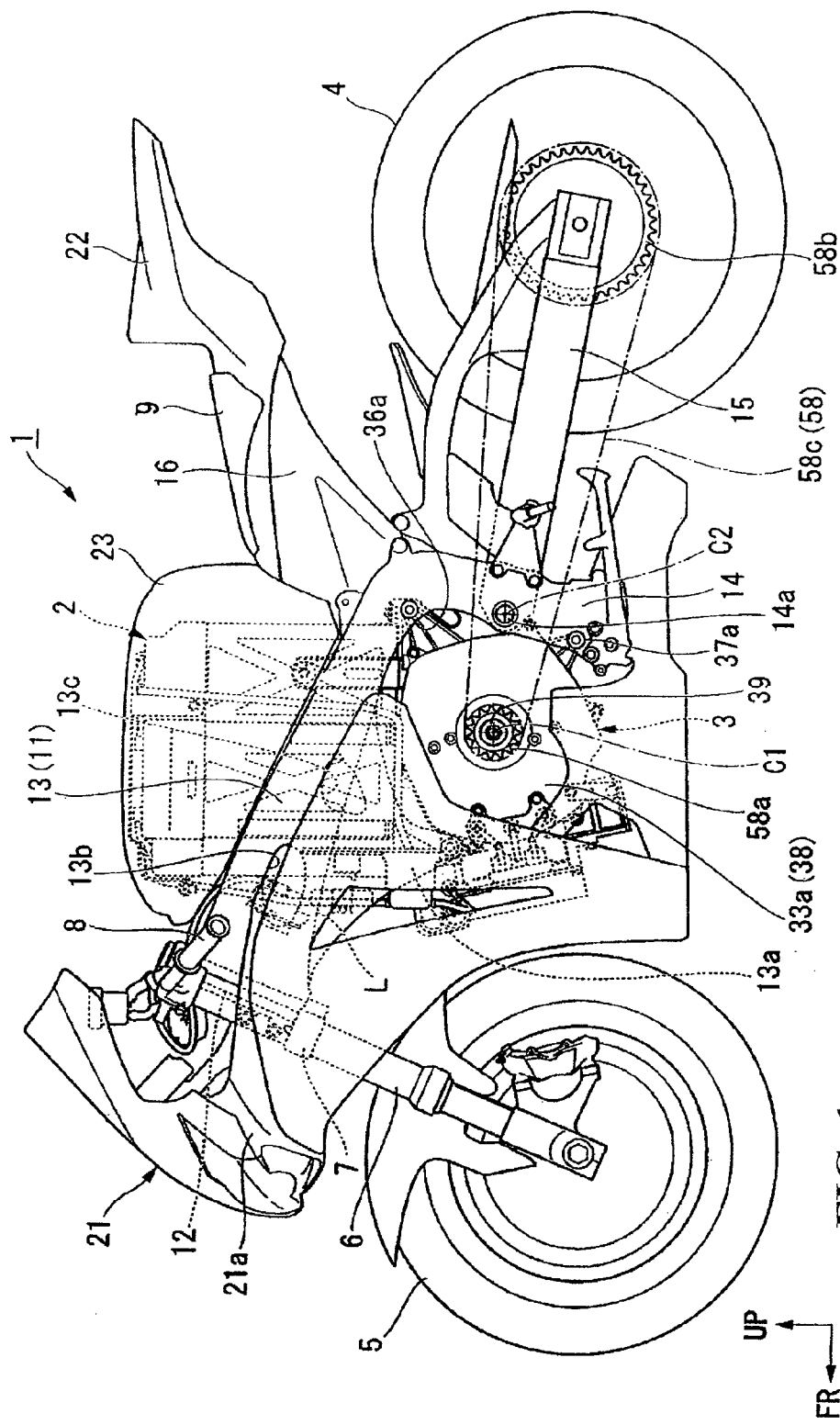
FIG. 1 is a left side elevational view of a saddle-type electric vehicle incorporating a battery mounting structure according to an exemplary embodiment of the present invention.
Figure 2:
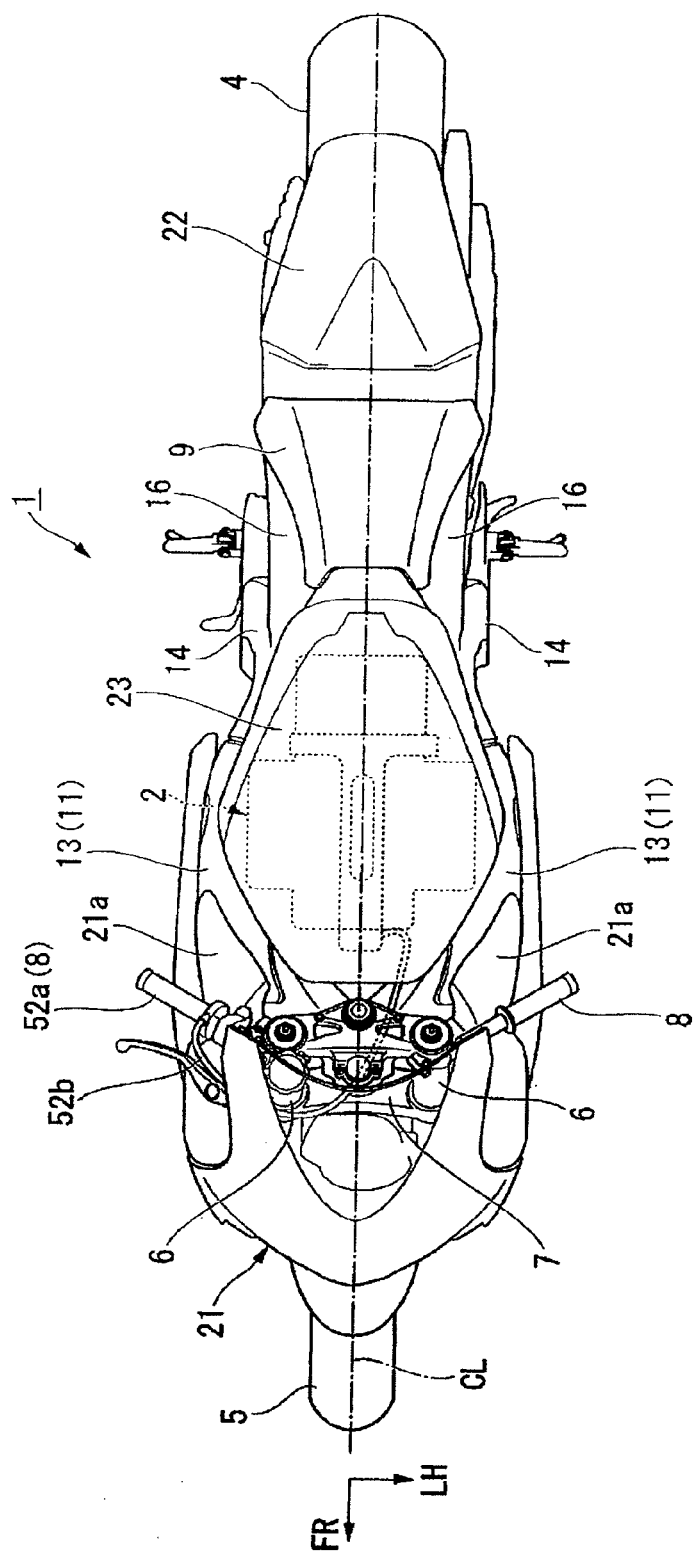
FIG. 2 is a plan view of the saddle-type electric vehicle.

As shown in FIGS. 1 and 2, a saddle-type electric vehicle 1 includes a main battery 2 for storing propulsive electric power disposed in an upper central portion of a vehicle body, and a propulsive drive motor (motor unit) 3 disposed in a lower central portion of the vehicle body. When the drive motor 3 is energized by electric power from the main battery 2, the drive motor 3 transmits its drive power to a rear wheel 4 as a drive wheel, propelling the saddle-type electric vehicle 1.

The saddle-type electric vehicle 1 includes a cowling 21 fully covering a portion of the vehicle body from a front side to a lower rear side thereof, and operates in a mode as a sports-type motorcycle capable of traveling in a sports-like fashion at high speeds. The saddle-type electric vehicle 1 has a front wheel 5 rotatably supported on the lower end of a pair of left and right front fork members 6 whose upper portions are connected to a steering stem 7 that is steerably supported in a head pipe 12 on the front end of a vehicle frame 11. A steering handle 8 is mounted on an upper portion of the steering stem 7 (or the front fork members 6).

The vehicle frame 11 includes a pair of left and right main frames 13 extending downwardly and rearwardly from the head pipe 12, and left and right pivot frames 14 extending downwardly from the respective rear ends of the left and right main frames 13. A swing arm 15 has a front end vertically swingably supported on the left and right pivot frames 14 by a pivot shaft 14a. A rear wheel 4 is supported on the rear end of the swing arm 15. The vehicle frame 11 is thus constructed as a twin-tube frame.

The saddle-type electric vehicle 1 has its front vehicle body portion covered with the cowling 21 at front, side, and rear regions thereof. The main battery 2 is mounted in position between the left and right main frames 13, with the drive motor 3 disposed below the left and right main frames 13. Left and right motor hangers 13a, each of an inverted triangular shape as seen in side elevation, extend downwardly from front lower portions of the respective left and right main frames 13. The drive motor 3 has a front portion supported on lower ends of the left and right motor hangers 13a. In FIG. 1, a line L represents the lower edges of the main frames 13 (the boundary between the main frames 13 and the motor hangers 13a).

A seat frame 16 extends upwardly and rearwardly from the rear ends of the left and right main frames 13 and the left and right pivot frames 14. A seat 9 for the rider to be seated thereon is supported on the seat frame 16. The seat frame 16 is covered with a seat cowl 22 disposed therearound. The vehicle frame 11 including the seat frame 16 is made up of a plurality of types of metal members that are integrally joined together by welding, fastening, or the like.

A seat front cover 23 which projects upwardly from the upper edges of the left and right main frames 13 is disposed in front of the seat 9. The seat front cover 23 is sandwiched between the knees of the rider seated on the seat 9. The main battery 2 has an upper portion accommodated in the seat front cover 23.

Figure 3:
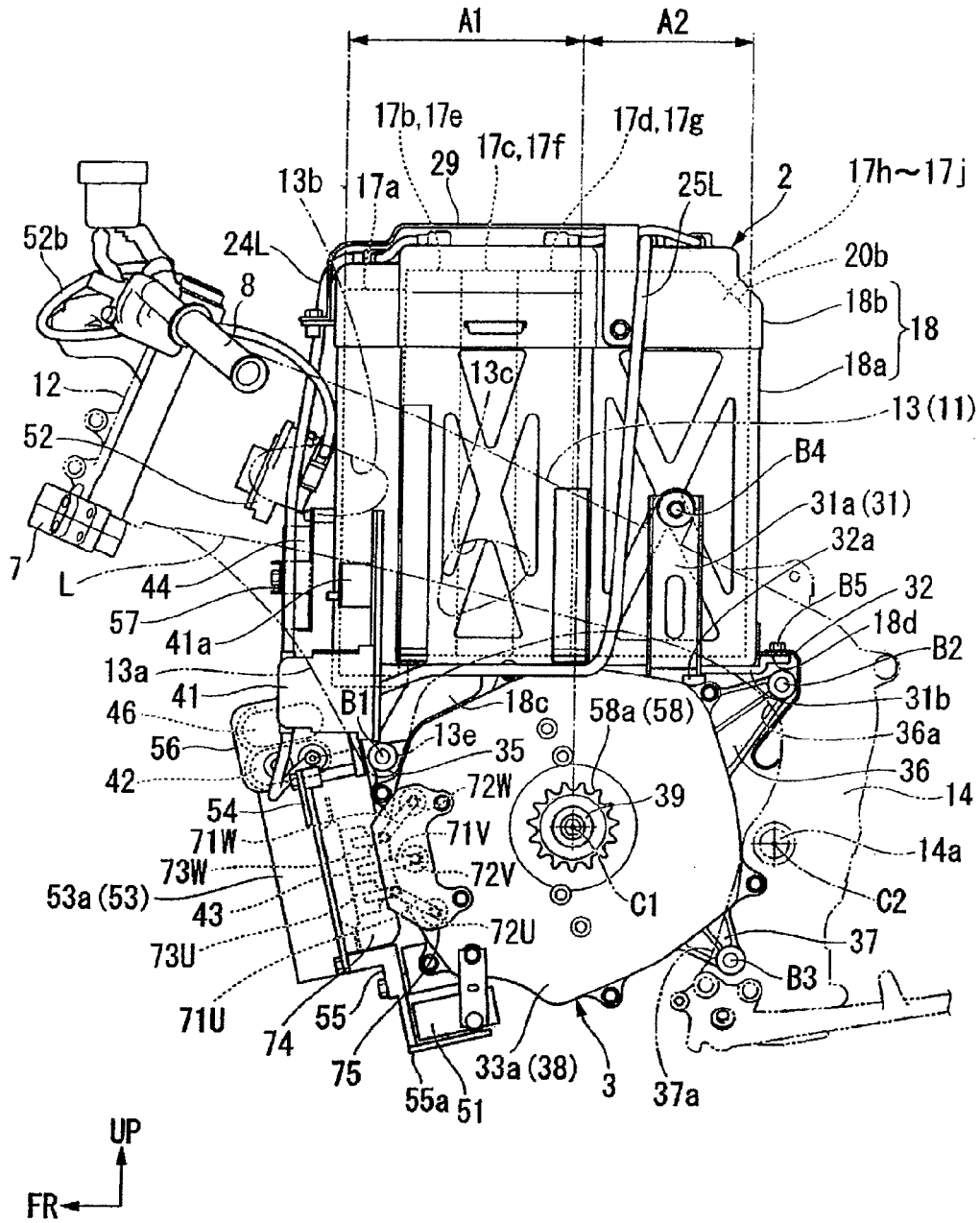
FIG. 3 is a left side elevational view of a central portion of the saddle-type electric vehicle.
Figure 4:
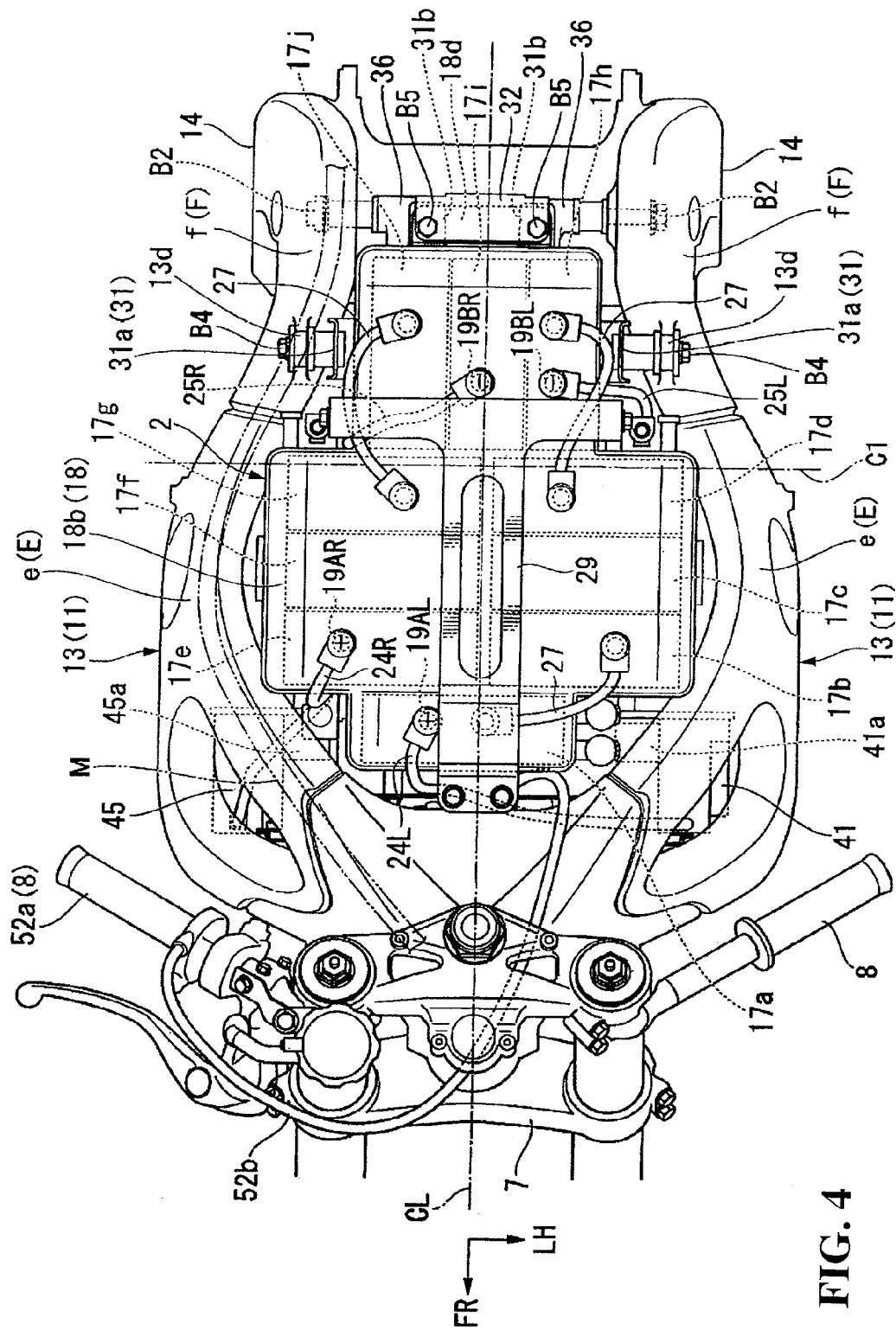
FIG. 4 is a plan view of the central portion of the saddle-type electric vehicle.
Figure 8:
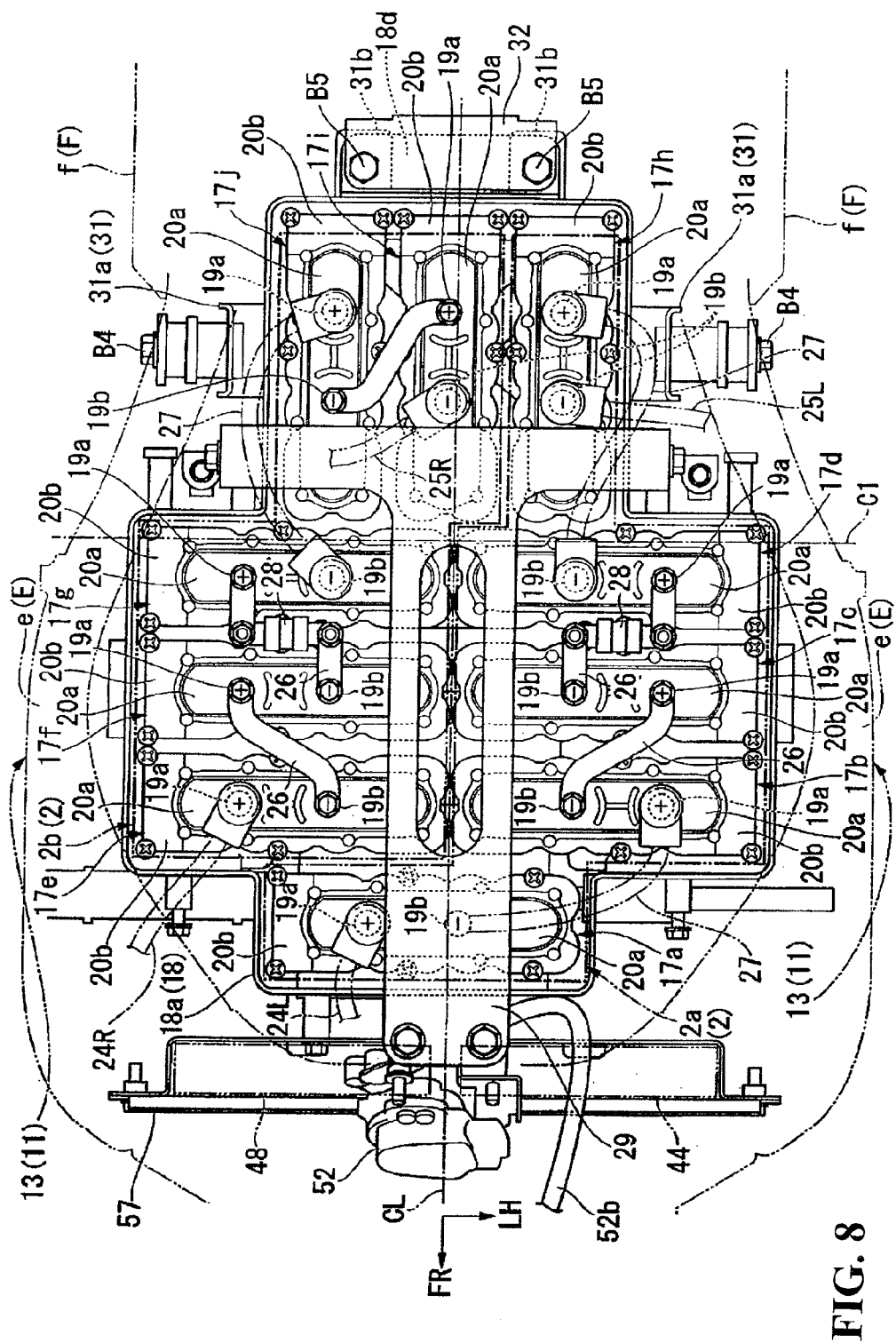
FIG. 8 is a plan view of a main battery of the saddle-type electric vehicle.

As shown in FIGS. 3, 4, and 8, the main battery 2 includes a total of ten battery modules 17a through 17j housed in a battery case 18. The battery case 18 includes a main case member 18a of sheet metal which is substantially in the form of a box shaped like a rectangular parallelepiped which is open upwardly, and a case cover 18b molded of plastics, for example, which closes an upper opening of the main case member 18a. The main case member 18a has openings defined in an outer wall thereof. In FIG. 8, the main battery 2 is shown with the case cover 18b removed.

Each of the battery modules 17a to 17j is formed like a thick plate extending in the vertical direction. At the front end portion and the longitudinally intermediate portion of the main battery 2, some of the battery modules 17a to 17j are arranged so that the direction along the long sides of each battery module is perpendicular to the lateral direction of the vehicle. At the rear portion of the main battery 2, the other battery modules are arranged so that the direction along the long sides of each battery module is perpendicular to the longitudinal direction of the vehicle.

More specifically, the single battery module 17a lies across a transversely central line CL of the vehicle in the front end portion of the main battery 2. The six battery modules 17b through 17g, three on each side of the transversely central line CL of the vehicle, are disposed longitudinally in tandem in the longitudinally intermediate portion of the main battery 2. The three battery modules 17h through 17j lie across the transversely central line CL of the vehicle in the rear end portion of the main battery 2 and are disposed in a transverse array. The battery modules 17b through 17g in the longitudinally intermediate portion of the main battery 2 are disposed in transversely symmetry with respect to the transversely central line CL of the vehicle, and the battery module 17a in the front end portion of the main battery 2 and the battery modules 17h through 17j in the rear end portion of the main battery 2 are slightly displaced to the right.

Figure 12:
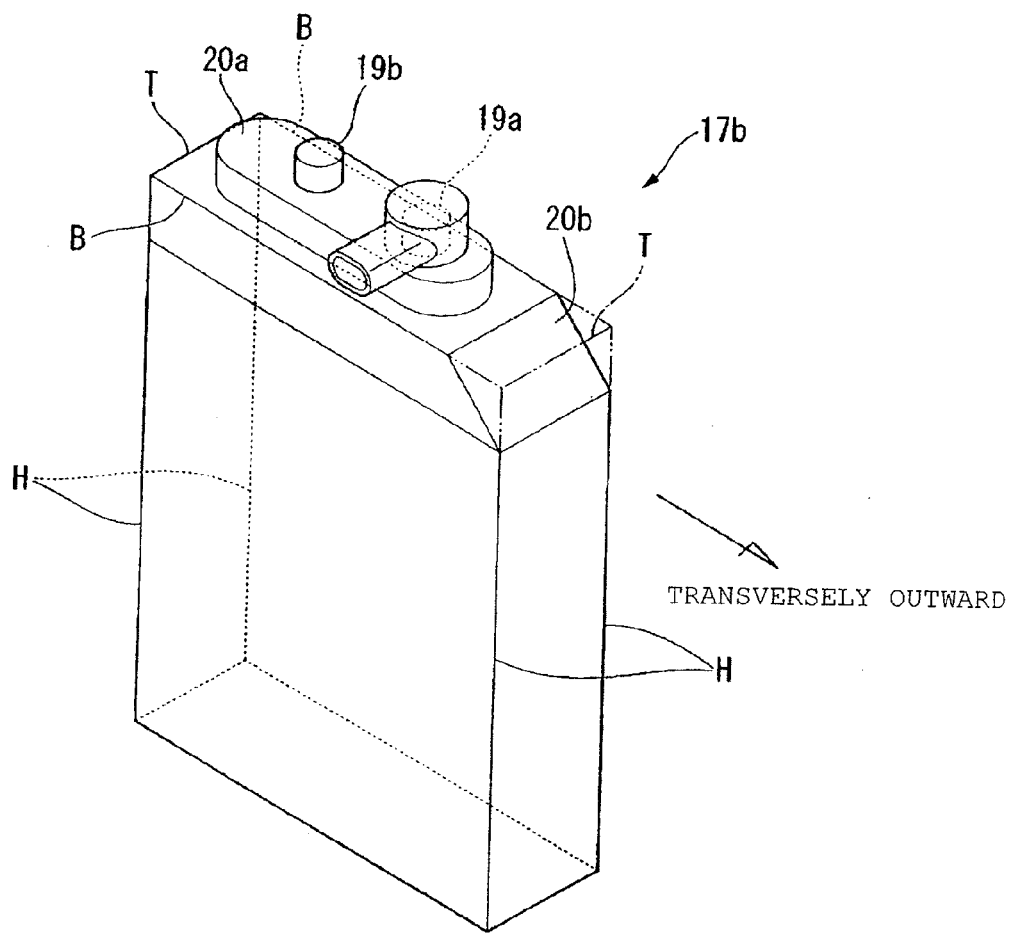
FIG. 12 is a perspective view of a battery module of the main battery.

As also shown in FIG. 12, each of the battery modules 17a through 17j is in the form of a quadrangular prism having long sides B and short sides T as viewed in plan and vertical sides H longer than the long sides B. In FIG. 12, the battery module 17b is illustrated as typifying the battery modules 17a through 17j.

The battery modules 17a through 17g are arranged such that the directions along the long sides B as viewed in plan extend along the transverse directions of the vehicle, and the battery modules 17h through 17j are arranged such that the directions along the long sides B as viewed in plan extend along the longitudinal directions of the vehicle.

As shown in FIG. 8, each of the left and right main frames 13 includes a region which is convex outwardly of the vehicle frame 11 in its longitudinally intermediate portion, the outwardly convex region and a region forward thereof being referred to as an outwardly curved region e. Each of the left and right main frames 13 includes a region which is convex inwardly of the vehicle frame 11 in its rear portion, the inwardly convex region and a region rearward thereof being referred to as an inwardly curved region f. The battery modules 17a through 17g are disposed between the left and right outwardly curved regions e (hereinafter referred to as a bulging region E of the vehicle frame 11), and the battery modules 17h through 17j are disposed between the left and right inwardly curved regions f (hereinafter referred to as a narrow region F of the vehicle frame 11).

With the battery modules 17a through 17j being thus disposed, the main battery 2 and the battery case 18 have a greater transverse width in their longitudinal intermediate portions than their front and rear portions. This allows the main battery 2 to be neatly housed in the seat front cover 23, which is of a longitudinally elliptical shape as viewed in plan (see FIG. 2), and reduces the transverse width of the rear portion of the seat front cover 23 to allow the rider to easily exert a knee grip on the seat front cover 23.

The battery module 17a that is positioned in the front end portion of the main battery 2 has its height smaller than the other battery modules 17b through 17j by a distance which is about the same as the vertical width of a beveled surface 20b to be described later. The battery module 17a with the reduced height makes the front end portion of the seat front cover 23 curved in a smoother shape as viewed in a side elevation for a better vehicle appearance. The battery modules 17h through 17j that are positioned in the rear end portion of the main battery 2 are of the same height as the battery modules 17b through 17g that are positioned in the longitudinally intermediate portion of the main battery 2. However, the height of the battery modules 17h through 17j that are positioned in the rear end portion of the main battery 2 may be made smaller as is the case with the battery module 17a, making the rear end portion of the seat front cover 23 curved in a smoother shape as viewed in side elevation.

As shown in FIGS. 3 and 8, the battery modules 17a through 17g which are disposed in the bulging region E are positioned forwardly of a central axis C1 of the drive motor 3, and the battery modules 17h through 17j which are disposed in the narrow region F are positioned rearwardly of the central axis C1 of the drive motor 3. The portion (indicated as a range A1 in FIG. 3) of the main battery 2 which is located forwardly of the central axis C1 is larger and heavier than the portion (indicated as a range A2 in FIG. 3) of the main battery 2 which is located rearwardly of the central axis C1. Therefore, the rider who is seated behind the main battery 2 finds it easy to exert a knee grip, and a good weight balance is achieved by the weight that includes the body weight of the rider.

As shown in FIG. 8, the battery modules 17a through 17j are disposed at spaced intervals to allow ambient air (cooling air) introduced into the battery case 18 to flow therebetween. Each of the battery modules 17a through 17j is an energy storage which is chargeable and dischargeable, and may include a lithium ion battery, a nickel hydrogen battery, a lead battery, or the like, for example.

Each of the battery modules 17a through 17j has a positive terminal 19a and a negative terminal 19b projecting on its upper end.

As also shown in FIG. 12, each of the battery modules 17a through 17j has a terminal cover 20a mounted on an upper surface thereof. The terminal cover 20a is of an oblong shape along the long sides B as viewed in plan, with the terminals 19a, 19b projecting upwardly therefrom at relative positions, respectively.

Each of the battery modules 17a through 17j has a beveled surface 20b on one of the corners along the short sides T on the upper end thereof. The beveled surface 20b is an oblique flat surface on the corner.

Figure 6:
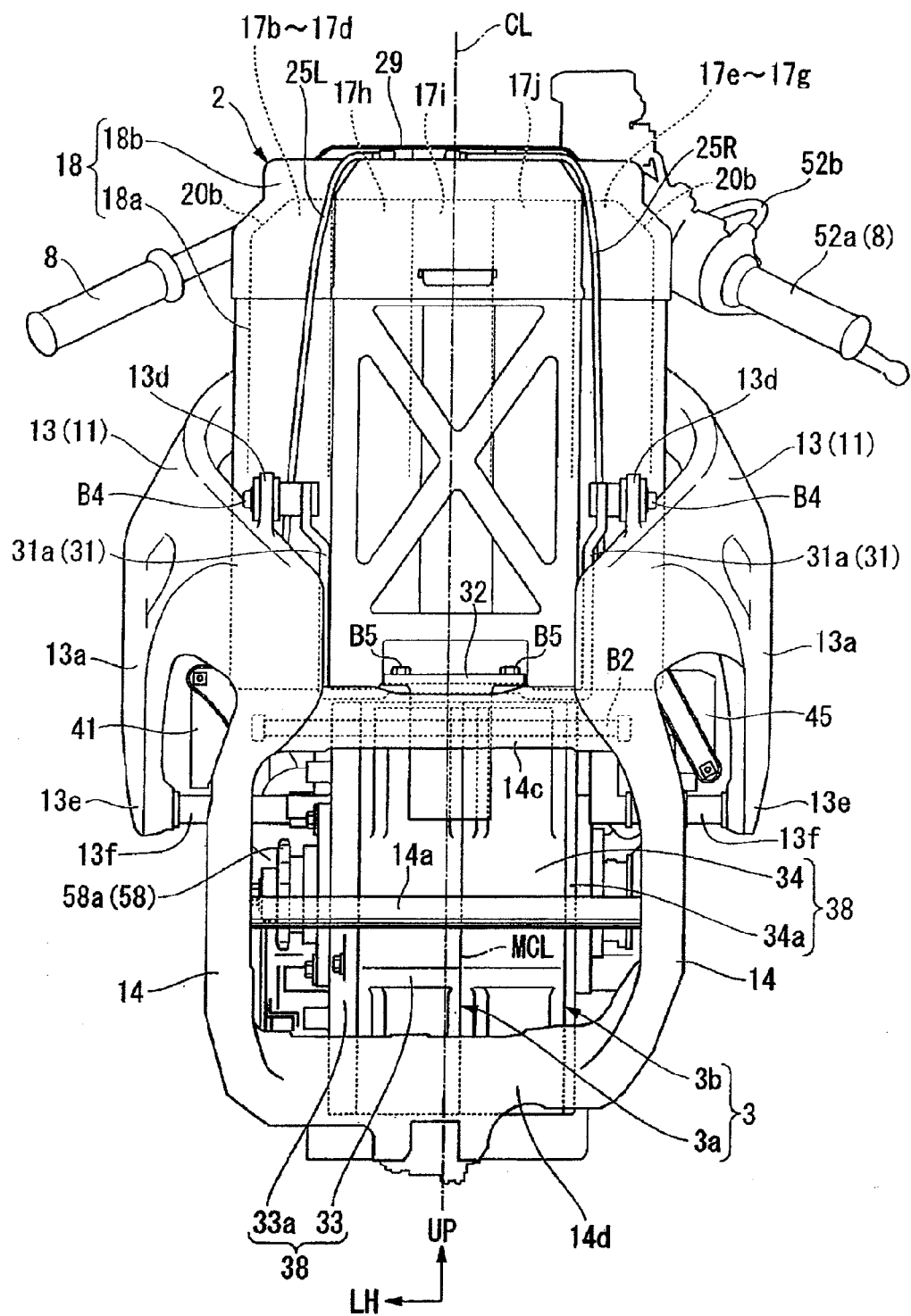
FIG. 6 is a rear elevational view of the central portion of the saddle-type electric vehicle.

The battery modules 17b through 17g positioned in the longitudinally intermediate portion of the main battery 2 are disposed such that their beveled surfaces 20b are positioned outwardly in the transverse directions of the vehicle (such that their beveled surfaces 20b are positioned at the outer corners of the upper end of the main battery 2 in the transverse directions of the vehicle) (see FIG. 6).

The battery modules 17h through 17j positioned in the rear end portion of the main battery 2 are disposed such that their beveled surfaces 20b are positioned rearwardly (such that their beveled surfaces 20b are positioned at the rear corner of the upper end of the main battery 2) (see FIG. 3).

The battery modules 17b through 17j thus disposed contribute to making the seat front cover 23 curved in a smoother shape.

Of the battery modules 17a through 17j, the battery module 17a in the front end portion of the main battery 2, the battery modules 17b through 17d in a left side of the longitudinally intermediate portion of the main battery 2, and the battery module 17h in a left side of the rear end portion of the main battery 2 are connected in series with each other, providing a first battery pack 2a having a prescribed high voltage (48 through 72 V).

The battery modules 17e through 17g in a right side of the longitudinally intermediate portion of the main battery 2, and the battery modules 17i, 17j in a right side of the rear end portion of the main battery 2 are connected in series with each other, providing a second battery pack 2b having a prescribed high voltage.

Each of the battery packs 2a, 2b can supply electric power under a voltage ranging from 175 to 200V if five of the battery modules 17a through 17j, each having a voltage ranging from 35 to 40 V, are connected in series with each other.

When each of the battery packs 2a, 2b supplies electric power individually to one of first and second motor bodies 3a, 3b to be described later, they can produce a power output equivalent to the power output of an engine whose piston displacement ranges from 250 to 400 cc.

As shown in FIGS. 4 and 8, the positive terminal 19a of the battery module 17a is used as a positive output terminal 19AL of the first battery pack 2a, and a first positive output cable 24L extends from the positive output terminal 19AL. The positive terminal 19a of the battery module 17e is used as a positive output terminal 19AR of the second battery pack 2b, and a second positive output cable 24R extends from the positive output terminal 19AR.

Similarly, the negative terminal 19b of the battery module 17h is used as a negative output terminal 19BL of the first battery pack 2a, and a first negative output cable 25L extends from the negative output terminal 19BL. The negative terminal 19b of the battery module 17i is used as a negative output terminal 19BR of the second battery pack 2b, and a second negative output cable 25R extends from the negative output terminal 19BR.

Inter-electrode bus bars and cables 26, 27 are interconnecting the positive and negative terminals of the battery packs 2a, 2b. Fuses 28 are provided in the inter-electrode bus bars 26 of the battery packs 2a, 2b, respectively. A securing bracket 29 secures the case cover 18b to the main case member 18a. A main harness M extends longitudinally of the vehicle body around the right side of the main battery 2.

As shown in FIGS. 3 and 4, the main battery 2 and the battery case 18 have upper portions projecting upwardly from the left and right main frames 13 as viewed in side elevation and lower portions projecting downwardly from the left and right main frames 13 as viewed in side elevation. Stated otherwise, the main battery 2 and the battery case 18 extend vertically across the left and right main frames 13 as viewed in a side elevation.

The main frames 13 have front openings 13b defined through front portions thereof in the transverse directions of the vehicle, and rear openings 13c defined through front portions thereof in the transverse directions of the vehicle and extending in both the lower edge portions of the main frames 13 and the upper end portion of the motor hangers 13a. The openings 13b, 13c serve to adjust the overall rigidity of the vehicle frame 11, and the front openings 13b also serve as inlet ports for introducing cooling air toward the main battery 2.

As also shown in FIGS. 1 and 2, ambient air inlet ducts 21a extend forwardly from the front openings 13b and have front ends that are open forwardly of the vehicle at the front end of the cowling 21. A flow of air (cooling air) is supplied through the ambient air inlet ducts 21a to the main battery 2 between the main frames 13.

Figure 10:
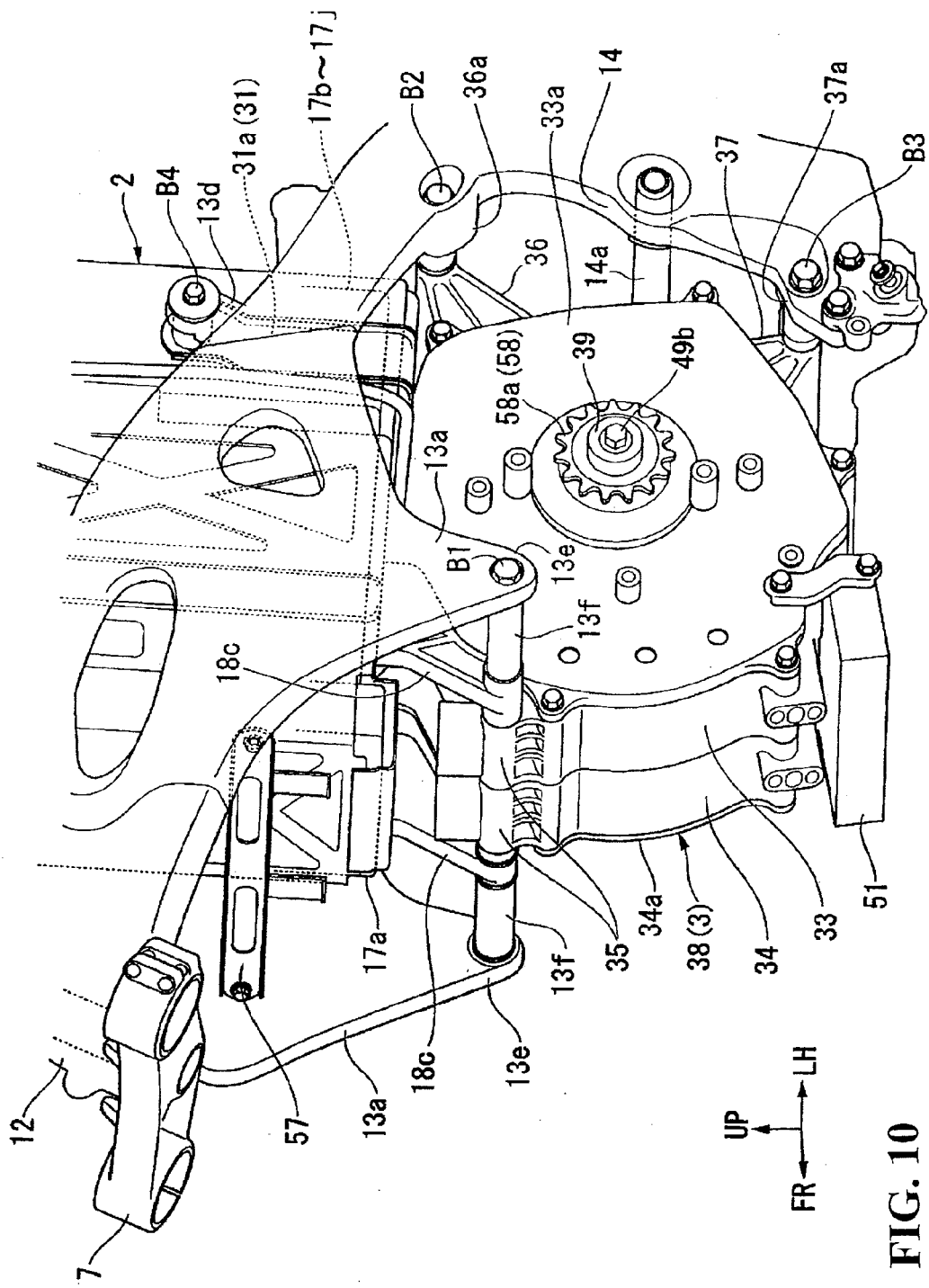
FIG. 10 is a perspective view, as seen obliquely from the left front side, of a drive motor and nearby parts of the saddle-type electric vehicle.

As shown in FIGS. 3 and 10, a pair of left and right battery front support arms 18c extend obliquely forwardly and downwardly from the lower surface of a front portion of the battery case 18. The left and right battery front support arms 18c have respective lower ends supported on and fixed to lower ends 13e of the left and right motor hangers 13a of the vehicle frame 11 by a fastener B1 such as an elongate bolt extending transversely of the vehicle. The fastener B1 is removably inserted inwardly transversely of the vehicle. Motor front supports 35 to be described later are also supported on and fixed to the lower ends 13e of the left and right motor hangers 13a by the fastener B2. Distance collars 13f are fitted over the fastener B1 and interposed between the lower ends 13e of the left and right motor hangers 13a and left and right battery front support arms 18c.

As shown in FIGS. 3 and 6, the battery case 18 has a rear portion supported on the vehicle frame 11 by a battery rear support bracket 31. The battery rear support bracket 31 includes a band-shaped bracket body 31a bent along a lower side of the rear portion of the battery case 18 and a joint 31b extending rearwardly from a lower side of the band-shaped bracket body 31a. The bracket body 31a has left and rear sides whose upper ends are supported on and fixed to respective battery support lobes 13d projecting from upper sides of the rear portions of the left and right main frames 13 by fasteners B4 such as bolts or the like extending transversely of the vehicle. The fasteners B4 are removably inserted inwardly transversely of the vehicle.

To an upper surface of the rear end of the joint 31b, there are fixed a substantially horizontal support plate 18d which is joined to a lower portion of the rear surface of the battery case 18 and projects rearwardly, and an upper end of a support stay 32 which extends downwardly behind the joint 31b, by fasteners B5 such as bolts or the like extending vertically. The fasteners B5 are removably inserted downwardly.

A collar or the like is integrally joined to a lower portion of the support stay 32. A fastener B2 such as an elongate bolt which extends transversely of the vehicle is inserted through the collar or the like to support and secure a motor rear upper portion support 36 to be described later on and to the vehicle frame 11.

The lower sides of rear portions of the support stay 32 and the battery case 18, and the motor rear upper portion support 36 are supported on and fixed to the vehicle frame 11 by the fasteners B2. The lower side of the bracket body 31a and the lower side of the rear portion of the battery case 18 are held against and supported on a support seat 32a on the upper surface of a rear end portion of a motor case 38 to be described later.

Figure 11:
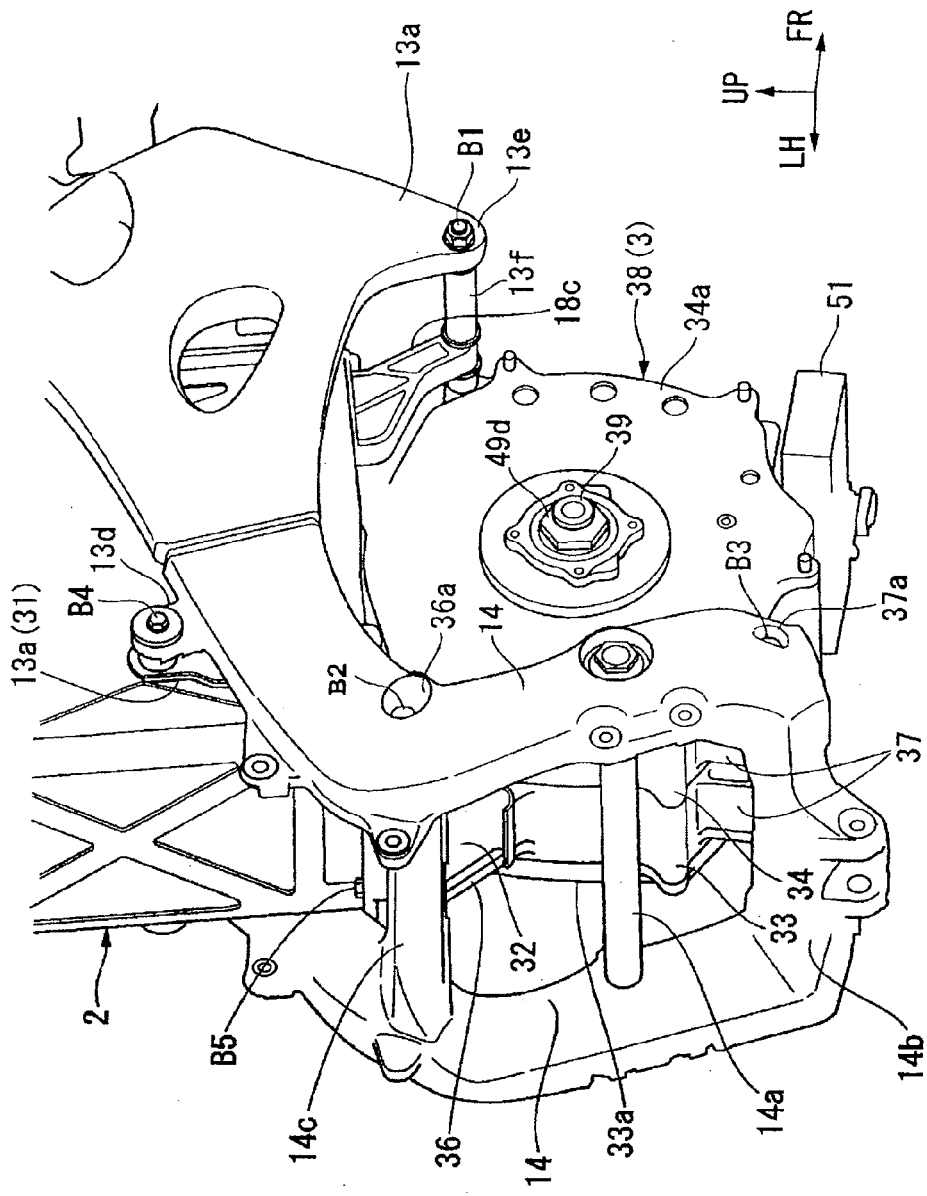
FIG. 11 is a perspective view, as seen obliquely from the right rear side, of the drive motor and the nearby parts.

The main battery 2 and the battery case 18 are securely supported on the vehicle frame 11 by the above structure. In FIGS. 6 and 11, a rear upper cross member 14c and a rear lower cross member 14d extend between the upper and lower ends of the left and right pivot frames 14.

As shown in FIGS. 1 and 3, the drive motor 3 is placed in a region surrounded by the main frames 13, the pivot frames 14, and the motor hangers 13a as viewed in side elevation. The drive motor 3 has a single drive shaft 39 which extends transversely therethrough at a central position thereof as viewed in side elevation. The drive shaft 39 has a central axis (corresponding to the center of gravity of the drive motor 3) C1 positioned above the central axis C2 of the pivot shaft 14a.

As also shown in FIGS. 10 and 11, the drive motor 3 has a pair of left and right flat motor bodies (unit motors) 3a, 3b each with a reduced transverse width (axial width). The motor bodies 3a, 3b are disposed adjacent to each other and coaxially joined together, so that they can be driven in unison with each other.

The drive motor 3 may be an inexpensive hybrid motor for use on four-wheeled automobiles. The drive motor 3 should preferably be designed so as to be equivalent to a sports-type engine whose piston displacement ranges from 250 to 400 cc, by using two motor bodies 3a, 3b each having a power output ranging from 12 to 18 kw.

The drive motor 3 has a transverse width smaller than the space between the left and right main frames 13 and the pivot frames 14. The left one of the motor bodies 3a, 3b will hereinafter be referred to as a first motor body 3a, and the right one as a second motor body 3b. The motor bodies 3a, 3b have mating surfaces aligned with the transverse center of the drive motor 3 and indicated as a transverse motor center line MCL in FIG. 6.

Each of the motor bodies 3a, 3b is of the inner rotor type wherein a rotor is disposed within a stator. The motor bodies 3a, 3b have respective first and second annular casings 33, 34. The motor front supports 35 project obliquely upwardly and forwardly from respective upper sides of the front ends of the casings 33, 34. The motor front supports 35 which are sandwiched between the left and right battery front support arms 18c, and the left and right battery front support arms 18c are supported on and fixed to the lower ends of the left and right motor hangers 13a by the fastener B1.

The motor rear upper portion supports 36 which extend obliquely upwardly and rearwardly are integrally joined to respective upper sides of the rear ends of the casings 33, 34 (see FIG. 3). The motor rear upper portion supports 36 are supported on and fixed to respective left and right inner sides of upper pivot fastening regions 36a on front sides of the upper end portions of the left and right pivot frames 14 by the fastener B2 which extends transversely of the vehicle. The fastener B2 is removably inserted inwardly transversely of the vehicle.

Motor rear lower portion supports 37 which extend obliquely downwardly and rearwardly are integrally joined to respective lower sides of the rear ends of the casings 33, 34 (see FIG. 3). The motor rear lower portion supports 37 are supported on and fixed to respective left and right inner sides of lower pivot fastening regions 37a on front sides of the lower end portions of the left and right pivot frames 14 by a fastener B3 such as an elongate bolt extending transversely of the vehicle. The fastener B3 is removably inserted inwardly transversely of the vehicle.

The drive motor 3 is fixedly supported on the vehicle frame 11 by the motor front supports 35, the motor rear upper portion supports 36, and the motor rear lower portion supports 37.

Figure 9:
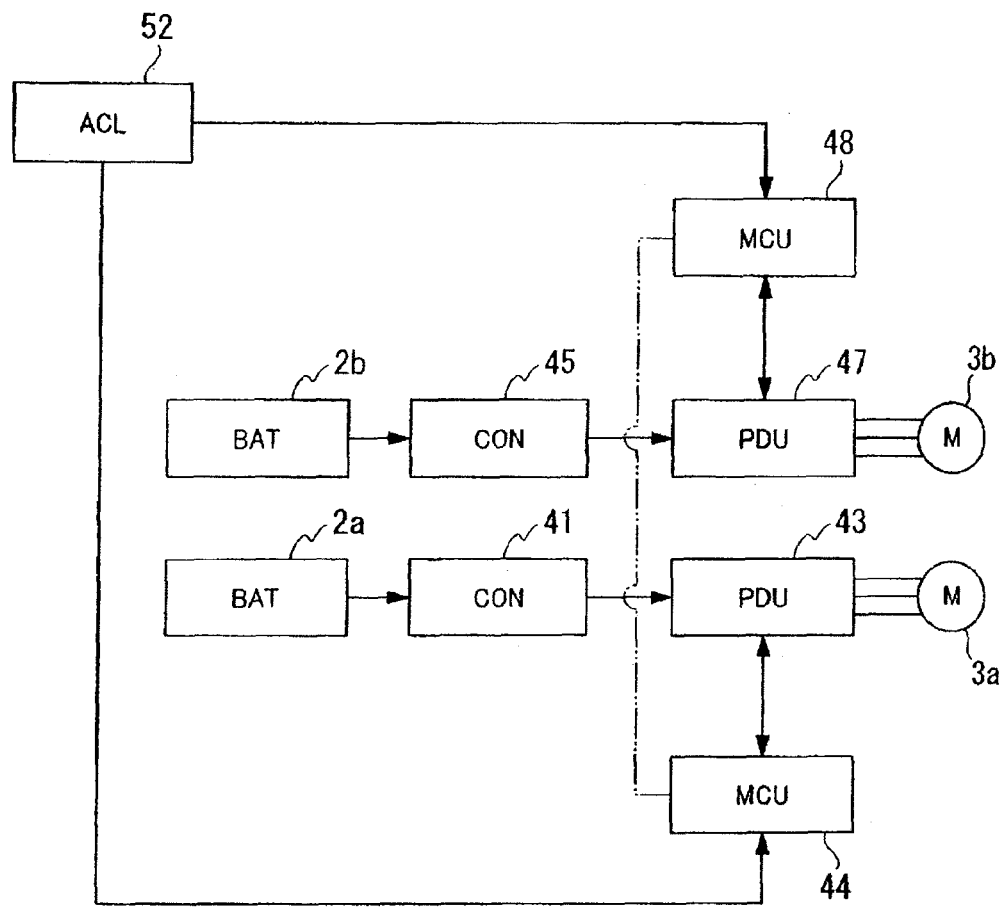
FIG. 9 is a diagram showing a main configuration of the saddle-type electric vehicle.

As shown in FIG. 9, electric power from the first battery pack 2a is supplied through a first contactor 41 which is ganged with a main switch, not shown, to a first PDU (Power Driver Unit) 43 as a motor driver. The supplied electric power is converted by the first PDU 43 from a direct current into a three-phase alternating current, which is supplied to the first motor body 3a as a three-phase alternating-current motor.

Similarly, electric power from the second battery pack 2b is supplied through a second contactor 45 which is also ganged with the main switch to a second PDU 47 as a motor driver. The supplied electric power is converted by the second PDU 47 from a direct current into a three-phase alternating current, which is supplied to the second motor body 3b as a three-phase alternating-current motor.

Figure 7:
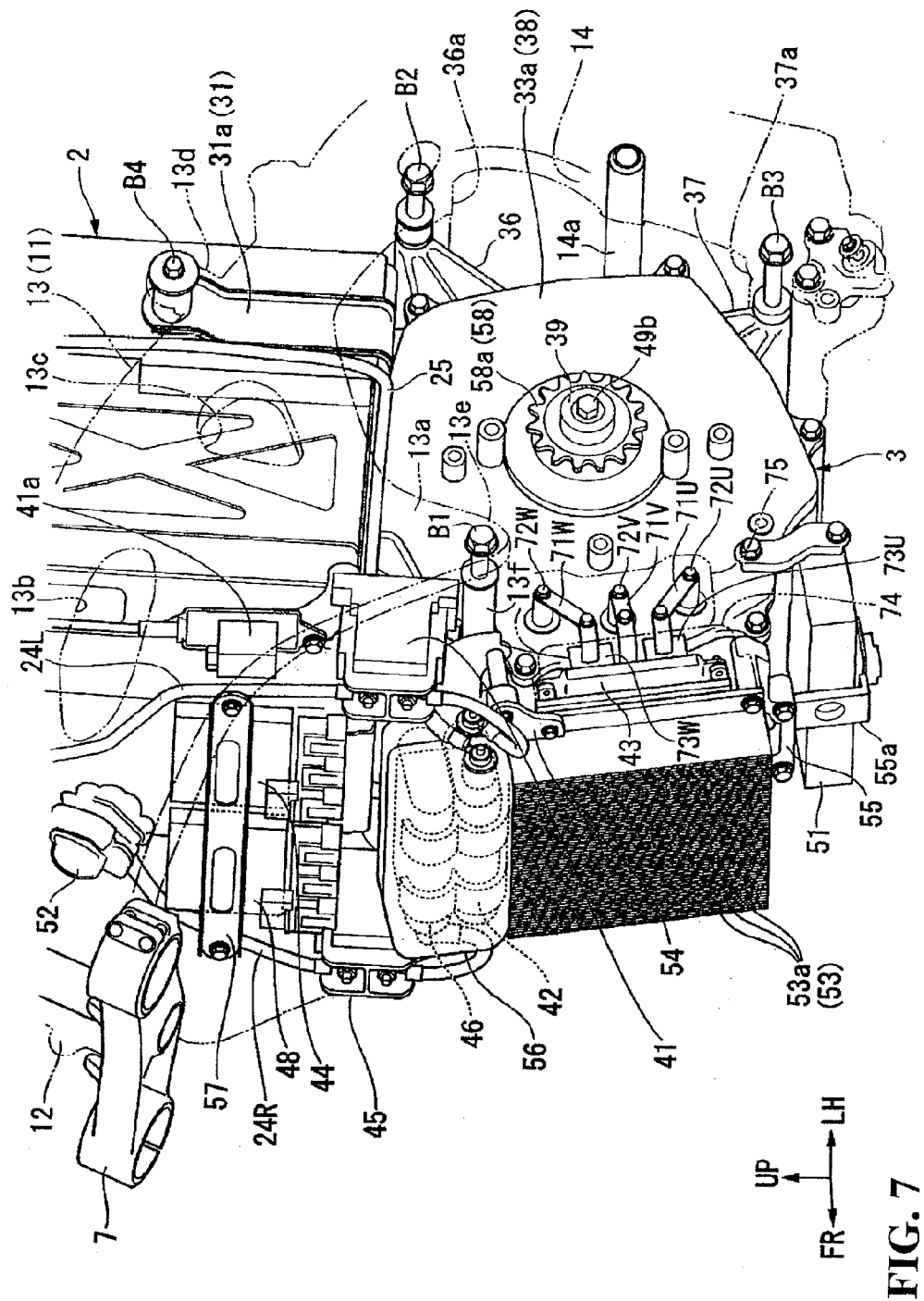
FIG. 7 is a perspective view, as seen obliquely from the left front side, of the central portion of the saddle-type electric vehicle.

As also shown in FIG. 7, an auxiliary battery 51 of 12 V is disposed below a front portion of the drive motor 3. The auxiliary battery 51 supplies electric power to general electric components such as lamps, etc. and control system components including an ECU (Electric Control Unit), etc.

A first MCU (Motor Control Unit) 44 as an ECU is connected to the first PDU 43, and a second MCU 48 as an ECU is connected to the second PDU 47. The first and second MCUs 44, 48 are supplied with an output request signal from a throttle (accelerator) sensor 52. Based on the output request signal, the first and second MCUs 44, 48 control the motor bodies 3a, 3b individually via the respective first and second PDUs 43, 47. In the present embodiment, the first and second MCUs 44, 48 do not monitor each other and do not communicate with each other. However, the first and second MCUs 44, 48 may be connected to each other for mutual communications as indicated by the chain lines in FIG. 9 so that they can mutually monitor the power outputs of the motor bodies and control their power outputs in coordination or independently.

For charging the main battery 2 on the saddle-type electric vehicle 1 according to the present embodiment, the seat front cover 23 is removed to expose the main battery 2, and the exposed main battery 2 is charged while being mounted on the saddle-type electric vehicle 1, or the main battery 2 is removed from the saddle-type electric vehicle 1, and the removed main battery 2 is charged while being dismounted on the saddle-type electric vehicle 1.

Figure 5:
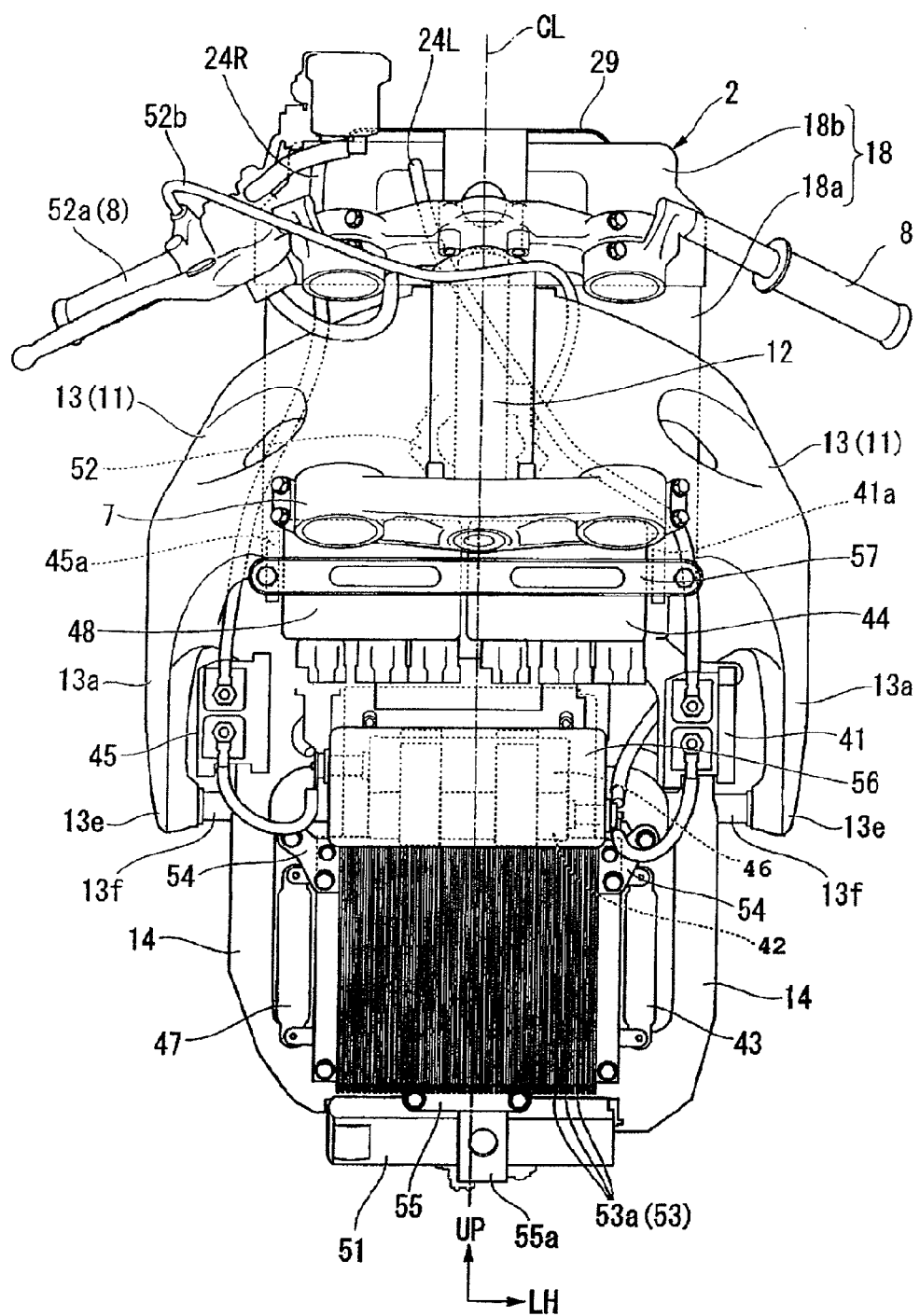
FIG. 5 is a front elevational view of the central portion of the saddle-type electric vehicle.

As shown in FIGS. 3, 5, and 7, the PDUs 43, 47 which are associated with the respective motor bodies 3a, 3b are disposed in a transverse array in front of the front end of the drive motor 3. Each of the PDUs 43, 47 is in the form of a thick plate erected substantially perpendicularly to the longitudinal direction of the vehicle (specifically, slightly tilted forwardly and downwardly). A planar heat sink 53 is disposed immediately in front of the PDUs 43, 47 in parallel relation thereto.

The heat sink 53 has a number of vertical heat radiating fins 53a on its front side. The PDUs 43, 47 have respective front surfaces held in contact with the rear side of the heat sink 53. The heat sink 53 has an upper portion supported on an upper portion of the motor case 38 of the drive motor 3 by upper brackets 54 and a lower portion supported on a lower portion of the motor case 38 of the drive motor 3 by a lower bracket 55. The lower bracket 55 has an integral battery support stay 55a extending along front and lower surfaces of the auxiliary battery 51 and bent into an L shape as viewed in side elevation, thereby supporting the auxiliary battery 51.

First and second capacitors 42, 46 that are associated with the contactors 41, 45 and the PDUs 43, 47 are disposed above the heat sink 53. Each of the first and second capacitors 42, 46 is in the form of a rod extending transversely and having a longitudinally elongate elliptical cross-sectional shape. The first and second capacitors 42, 46, which are stacked vertically, are disposed above the heat sink 53. The first and second capacitors 42, 46 are housed together in a capacitor case 56.

The contactors 41, 45 are disposed transversely outwardly of the respective capacitors 42, 46 and spaced obliquely upwardly and rearwardly from the respective capacitors 42, 46 as viewed in side elevation. Each of the contactors 41, 45 is in the form of a rectangular parallelepiped. The contactors 41, 45 are disposed between the capacitors 42, 46 and the left and right motor hangers 13a that are positioned transversely outwardly of the respective capacitors 42, 46. Relatively small precharging contactors 41a, 45a are disposed respectively above the contactors 41, 45.

The MCUs 44, 48 are disposed in a transverse array above the respective contactors 41, 45 and in front of a lower portion of the main battery 2. Each of the MCUs 44, 48 is in the form of a rectangular parallelepiped with a reduced longitudinal width, and is supported by an MCU support bracket 57 that is fixed to a front side of the lower portion of the battery case 18.

The throttle sensor 52 is disposed above the MCUs 44, 48 and fixed to the vehicle frame 11 behind the head pipe 12. The throttle sensor 52 is coupled to a right grip 52a as a throttle operator of the steering handle 8 by an operating cable 52b. Opening and closing movements of the right grip 52a are mechanically transmitted via the operating cable 52b to the throttle sensor 52, which outputs control signals depending on the opening and closing movements to the MCUs 44, 48.

As shown in FIGS. 10 and 11, the motor bodies 3a, 3b include respective first and second annular stators (not shown) fixedly supported on the respective inner circumferential surfaces of the casings 33, 34 and respective first and second hollow cylindrical rotors (not shown) rotatably disposed respectively in the stators. The rotors are integrally coupled to each other by the drive shaft 39 that coaxially extends through the rotors.

A left case cover 33a is attached to a left side of the first casing 33 in closing relation to a left opening defined in the first casing 33, and a right case cover 34a is attached to a right side of the second casing 34 in closing relation to a right opening defined in the second casing 34. The casings 33, 34 and the case covers 33a, 34a are integrally fastened together by bolts, making up the motor case 38 of the drive motor 3.

As also shown in FIG. 1, the drive shaft 39 has a left end projecting leftwardly from the center of the left case cover 33a, and a drive sprocket 58a is mounted on the projecting left end. The drive sprocket 58a, a driven sprocket 58b mounted on the left side of the rear wheel 4, and a drive chain 58c trained around these sprockets jointly make up a chain-driven transmitting mechanism 58 between the drive motor 3 and the rear wheel 4.

The drive motor 3 is energized in a variable-speed mode by a VVVF (Variable Voltage Variable Frequency) control process. The rotational speed of the drive motor 3 is detected by a rotation sensor, not shown.

As shown in FIGS. 3 and 7, power feeder terminals 72u, 72v, 72w are mounted on front end portions of the case covers 33a, 34a, and three-phase power feeder bars 71u, 71v, 71w which extend rearwardly from transversely outer sides of the PDUs 43, 47 are connected to the respective power feeder terminals 72u, 72v, 72w. The power feeder bars 71u, 71v, 71w and the power feeder terminals 72u, 72v, 72w serve respectively as a U phase, a V phase, and a W phase that are arranged successively upwardly in the order named. Currents from the PDUs 43, 47 are supplied via the power feeder bars 71u, 71v, 71w and the power feeder terminals 72u, 72v, 72w to the coils of the stators of the motor bodies 3a, 3b.

Current sensors 73u, 73w are connected respectively to the proximal ends of the power feeder bars 71u, 71w of the U, W phases on the PDUs 43, 47. The PDUs 43, 47 are covered with driver covers 74, and the power feeder bars 71u, 71v, 71w and the power feeder terminals 72u, 72v, 72w are covered with feeder covers 75.

As described above, the battery mounting structure according to the present embodiment is applied to the saddle-type electric vehicle 1 which includes the vehicle frame 11 constructed as a twin-tube frame having the pair of left and right main frames 13 extending rearwardly from the head pipe 12, the main battery 2 including the battery modules 17a through 17j, and the drive motor 3 which is energized by electric power supplied from the main battery 2, wherein each of the battery modules 17a through 17j is in the form of a quadrangular prism having long sides B and short sides T as viewed in plan and vertical sides H longer than the long sides B, the vehicle frame 11 includes the bulging region E in which each of the main frames 13 bulges outwardly from the head pipe 12 as viewed in plan and the narrow region F in which the distance between the main frames 13 is reduced behind the bulging region E, the battery modules 17a through 17j include battery modules (battery modules 17a through 17g) whose long sides B extend along transverse directions of the vehicle in the bulging region E and battery modules (battery modules 17h through 17j) whose long sides B extend along longitudinal directions of the vehicle in the narrow region F.

With the above arrangement, in the bulging region E whose rigidity is more difficult to achieve than the narrow region F in the twin-tube frame, some of the battery modules 17a through 17j are arranged with their long sides oriented along the transverse directions of the vehicle (extending between the left and right main frames 13). Therefore, those battery modules also function as rigid members of the vehicle frame 11, thereby increasing the rigidity of the vehicle frame 11, and the battery modules which are arrayed along the transverse directions of the vehicle are also arrayed along the longitudinal directions of the vehicle, resulting in an improved battery carrying capability.

In the narrow region F of the vehicle frame 11, some of the battery modules 17a through 17j are arranged with their long sides oriented along the longitudinal directions of the vehicle, making it possible to adjust the number of battery modules carried depending on the narrow region F. Therefore, the battery carrying capability can further be improved, and the total width of the narrow region F is reduced to allow the rider of the vehicle to easily exert a knee grip.

In the battery mounting structure, the main battery 2 is disposed so as to extend vertically across the main frames 13 as viewed in side elevation.

This arrangement allows the vehicle to mount the main battery 2 that is large in size and capacity.

The battery mounting structure further includes the battery case 18 housing the main battery 2 therein and the seat front cover 23 covering the battery case 18 to serve as part of the appearance of the vehicle, wherein the battery module 17a positioned in a front end portion of the bulging region E, among the battery modules 17a through 17g disposed in the bulging region E, has a height smaller than the battery modules 17b through 17g positioned therebehind.

With the above arrangement, the seat front cover 23 may be curved with a front end portion thereof at a reduced height. Thus, a round shape for a better appearance may be provided.

The battery mounting structure further includes the battery case 18 housing the main battery 2 therein and the seat front cover 23 covering the battery case 18 to serve as part of the appearance of the vehicle, wherein the battery module 17a positioned in a front end portion of the bulging region E, among the battery modules 17a through 17g disposed in the bulging region E, is fewer than the battery modules 17b through 17g positioned therebehind which are arranged in a transverse array.

With the above arrangement, the seat front cover 23 may be curved with a front end portion thereof at a reduced transverse width. Thus, a round shape for a better appearance may be provided.

The battery mounting structure further includes the battery case 18 housing the main battery 2 therein, the motor case 38 housing the drive motor 3 therein, the battery front support arms 18c extending downwardly from the lower surface of the battery case 18, and the motor front supports 35 formed on the motor case 38, wherein the motor case 38 is disposed in a region surrounded by the vehicle frame 11 below the battery case 18, and the battery front support arms 18c and the motor front supports 35 are coaxially supported by the motor hangers 13a of the vehicle frame 11.

With the above arrangement, the battery case 18 and the motor case 38 can be assembled with ease as they are coaxially supported.

In the battery mounting structure, each of the battery modules 17a through 17j has the beveled surface 20b on one of the corners along the short sides T on the upper end thereof, the battery modules 17a through 17g disposed in the bulging region E include battery modules arranged in a transverse array, and the beveled surfaces 20b of the battery modules arranged in the transverse array are disposed outwardly on the upper end of the main battery 2 in the transverse directions of the vehicle.

With the above arrangement, in the bulging region E, the beveled surfaces 20b of the battery modules in the transverse array provide beveled surfaces on outer corners of the upper end of the main battery 2 in the transverse directions of the vehicle. Thus, the seat front cover 23 may be given a round shape for a better appearance.

In the battery mounting structure, the battery modules 17b through 17g disposed in the bulging region E are arranged in transverse pairs and have respective positive terminals 19a disposed on the upper end of the main battery 2 outwardly in the transverse directions of the vehicle. Therefore, the positive terminals 19a of the battery modules 17b through 17g disposed in the bulging region E can easily be recognized, and are arranged for ease with which to connect wires to the positive terminals 19a.

In the battery mounting structure, the battery modules 17h through 17j disposed in the narrow region F have respective positive terminals 19a disposed on a rear side of the main battery 2 in the longitudinal directions thereof. Therefore, the positive terminals 19a of the battery modules 17h through 17j disposed in the narrow region F can easily be recognized, and are arranged for ease with which to connect wires to the positive terminals 19a.

In the battery mounting structure, the battery modules 17a through 17j are divided into the first battery pack 2a which includes the battery modules 17b through 17d disposed in one side of the bulging region E in the transverse directions of the vehicle, and the second battery pack 2b which includes the battery modules 17e through 17g disposed in other side of the bulging region E in the transverse directions of the vehicle, the first battery pack 2a and the second battery pack 2b being disposed parallel to each other, and the first and second battery packs 2a, 2b have positive output terminals 19AL, 19AR disposed on front sides thereof in the longitudinal directions thereof and negative output terminals 19BL, 19BR disposed on rear sides thereof in the longitudinal directions thereof.

In the first battery pack 2a, the battery module 17d which is positioned in the one side of the rear end portion of the bulging region E in the transverse directions of the vehicle has a negative terminal 19b connected to the positive terminal 19a of the battery module 17h, among the battery modules 17h through 17j disposed in a transverse array in the narrow region F, positioned on an outermost side in the one side of the rear end portion of the narrow region F in the transverse directions of the vehicle. In the second battery pack 2b, the battery module 17g which is positioned in the other side of the rear end portion of the bulging region E in the transverse directions of the vehicle has a negative terminal 19b connected to the positive terminal 19a of the battery module 17j, among the battery modules 17h through 17j disposed in a transverse array in the narrow region F, positioned on an outermost side in the other side of the rear end portion of the narrow region F in the transverse directions of the vehicle.

Therefore, the negative terminals 19b on the front side in the longitudinal directions of the battery modules 17h, 17j that are disposed on the outermost sides of the narrow region F may serve as the negative output terminals 19BL, 19BR of the battery packs 2a, 2b, for easy connection to electric components disposed centrally in the vehicle body of the vehicle.

In the battery mounting structure, the drive motor 3 having the drive shaft 39 extending along the transverse directions of the vehicle is disposed below the main battery 2, and the battery modules 17a through 17g disposed in the bulging region E are disposed forwardly of the drive shaft central axis C1 of the drive motor 3 as viewed in plan, and the battery modules 17h through 17j disposed in the narrow region F are disposed rearwardly of the drive shaft central axis C1 of the drive motor 3 as viewed in plan. The weight of the main battery 2 is thus appropriately distributed forwardly and rearwardly of the drive shaft central axis C1 of the drive motor 3.

The present invention is not limited to the above embodiment. The saddle-type electric vehicle covers all vehicles that the rider can sit astride, including not only two-wheeled vehicles (including scooter-type vehicles), but also three-wheeled vehicles (including vehicles with a single front wheel and two rear wheels and vehicles with two front wheels and a single rear wheel) and four-wheeled vehicles.

The structure according to the first embodiment is illustrated as an example of the present invention, and various changes may be made thereto without departing from the scope of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A battery mounting structure in a saddle electric vehicle including a twin-tube frame having a pair of left and right main frames extending rearwardly from a head pipe, a propulsive battery including a plurality of battery modules, and a motor energized by electric power supplied from said propulsive battery, comprising:
    each of said battery modules is in the form of a quadrangular prism having long sides and short sides as viewed in plan and vertical sides longer than said long sides, said twin-tube frame includes a bulging region in which each of said main frames bulges outwardly from said head pipe as viewed in plan and a narrow region in which a distance between said main frames is reduced behind said bulging region, said battery modules include battery modules whose long sides extend along transverse directions of the vehicle in said bulging region and battery modules whose long sides extend along longitudinal directions of the vehicle in said narrow region.

2. The battery mounting structure in a saddle electric vehicle according to claim 1, wherein said propulsive battery is disposed to extend vertically across said main frames as viewed in a side elevation.

3. The battery mounting structure in a saddle electric vehicle according to claim 1, and further comprising a battery case housing said propulsive battery therein and a vehicle body cover covering outside said battery case to serve as part of the appearance of the vehicle, wherein the battery module positioned in a front end portion of said bulging region, among the battery modules disposed in the bulging region, has a height smaller than the battery modules positioned therebehind.

4. The battery mounting structure in a saddle electric vehicle according to claim 2, and further comprising a battery case housing said propulsive battery therein and a vehicle body cover covering outside said battery case to serve as part of the appearance of the vehicle, wherein the battery module positioned in a front end portion of said bulging region, among the battery modules disposed in the bulging region, has a height smaller than the battery modules positioned therebehind.

5. The battery mounting structure in a saddle electric vehicle according to claim 1, and further comprising a battery case housing said propulsive battery therein and a vehicle body cover covering outside said battery case to serve as part of the appearance of the vehicle, wherein the battery module positioned in a front end portion of the bulging region, among the battery modules disposed in the bulging region, is fewer than the battery modules positioned therebehind which are arranged in a transverse array.

6. The battery mounting structure in a saddle electric vehicle according to claim 2, and further comprising a battery case housing said propulsive battery therein and a vehicle body cover covering outside said battery case to serve as part of the appearance of the vehicle, wherein the battery module positioned in a front end portion of the bulging region, among the battery modules disposed in the bulging region, is fewer than the battery modules positioned therebehind which are arranged in a transverse array.

7. The battery mounting structure in a saddle electric vehicle according to claim 1, and further comprising a battery case housing said propulsive battery therein, a motor case housing said motor therein, battery support stays extending downwardly from a lower surface of said battery case, and motor front bosses on said motor case, wherein said motor case is disposed in a region surrounded by said twin-tube frame below said battery case, and said battery support stays and said motor support bosses are coaxially supported by mounts of said twin-tube frame.

8. The battery mounting structure in a saddle electric vehicle according to claim 2, and further comprising a battery case housing said propulsive battery therein, a motor case housing said motor therein, battery support stays extending downwardly from a lower surface of said battery case, and motor front bosses on said motor case, wherein said motor case is disposed in a region surrounded by said twin-tube frame below said battery case, and said battery support stays and said motor support bosses are coaxially supported by mounts of said twin-tube frame.

9. The battery mounting structure in a saddle electric vehicle according to claim 1, wherein each of said battery modules has a beveled surface on one of a pair of corners along said short sides on the upper end thereof, the battery modules disposed in said bulging region include battery modules arranged in at least a transverse pair, and the beveled surfaces of the battery modules arranged in the transverse pair are disposed outwardly on an upper end of said propulsive battery in the transverse directions of the vehicle.

10. The battery mounting structure in a saddle electric vehicle according to claim 2, wherein each of said battery modules has a beveled surface on one of a pair of corners along said short sides on the upper end thereof, the battery modules disposed in said bulging region include battery modules arranged in at least a transverse pair, and the beveled surfaces of the battery modules arranged in the transverse pair are disposed outwardly on an upper end of said propulsive battery in the transverse directions of the vehicle.

11. The battery mounting structure in a saddle electric vehicle according to claim 3, wherein each of said battery modules has a beveled surface on one of a pair of corners along said short sides on the upper end thereof, the battery modules disposed in said bulging region include battery modules arranged in at least a transverse pair, and the beveled surfaces of the battery modules arranged in the transverse pair are disposed outwardly on an upper end of said propulsive battery in the transverse directions of the vehicle.

12. The battery mounting structure in a saddle electric vehicle according to claim 1, wherein the battery modules disposed in said bulging region include battery modules which are arranged in transverse pairs and having respective positive terminals disposed on an upper end of said propulsive battery outwardly in the transverse directions of the vehicle.

13. The battery mounting structure in a saddle electric vehicle according to claim 2, wherein the battery modules disposed in said bulging region include battery modules which are arranged in transverse pairs and having respective positive terminals disposed on an upper end of said propulsive battery outwardly in the transverse directions of the vehicle.

14. The battery mounting structure in a saddle electric vehicle according to claim 3, wherein the battery modules disposed in said bulging region include battery modules which are arranged in transverse pairs and having respective positive terminals disposed on an upper end of said propulsive battery outwardly in the transverse directions of the vehicle.

15. The battery mounting structure in a saddle electric vehicle according to claim 12, wherein the battery modules disposed in said narrow region have respective positive terminals disposed on a rear side of said propulsive battery in the longitudinal directions thereof.

16. The battery mounting structure in a saddle electric vehicle according to claim 15, wherein the battery modules are divided into a first battery pack which includes the battery modules disposed in one side of said bulging region in the transverse directions of the vehicle, and a second battery pack which includes the battery modules disposed in other side of said bulging region in the transverse directions of the vehicle, said first battery pack and said second battery pack being disposed parallel to each other, and the first and second battery packs have positive output terminals disposed on front sides thereof in the longitudinal directions thereof and negative output terminals disposed on rear sides thereof in the longitudinal directions thereof;

in said first battery pack, the battery module which is positioned in the one side of the rear end portion of said bulging region in the transverse directions of the vehicle has a negative terminal connected to the positive terminal of the battery module, among the battery modules disposed in a transverse array in said narrow region, positioned on an outermost side in the one side of the rear end portion of said narrow region in the transverse directions of the vehicle; and in said second battery pack, the battery module which is positioned in the other side of the rear end portion of said bulging region in the transverse directions of the vehicle has a negative terminal connected to the positive terminal of the battery module, among the battery modules disposed in the transverse array in said narrow region, positioned on an outermost side in the other side of the rear end portion of said narrow region in the transverse directions of the vehicle.

17. The battery mounting structure in a saddle electric vehicle according to claim 1, wherein said motor has a drive shaft extending along the transverse directions of the vehicle and is disposed below said propulsive battery, and the battery modules disposed in said bulging region are disposed forwardly of a drive shaft central axis of said motor as viewed in plan, and the battery modules disposed in said narrow region are disposed rearwardly of the drive shaft central axis of said motor as viewed in plan.

18. A battery mounting structure in a saddle electric vehicle comprising:
a twin-tube frame having a pair of left and right main frames extending rearwardly from a head pipe, said twin-tube frame including a bulging region in which each of said main frames bulges outwardly from said head pipe as viewed in plan and a narrow region in which a distance between said main frames is reduced behind said bulging region; and
a propulsive battery including a plurality of battery modules wherein each of said battery modules is in the form of a quadrangular prism having long sides and short sides as viewed in plan and vertical sides longer than said long sides and said battery modules including battery modules whose long sides extend along transverse directions of the vehicle in said bulging region and battery modules whose long sides extend along longitudinal directions of the vehicle in said narrow region.

19. The battery mounting structure in a saddle electric vehicle according to claim 18, wherein said propulsive battery is disposed to extend vertically across said main frames as viewed in a side elevation.

20. The battery mounting structure in a saddle electric vehicle according to claim 18, and further comprising a battery case housing said propulsive battery therein and a vehicle body cover covering outside said battery case to serve as part of an appearance of the vehicle, wherein the battery module positioned in a front end portion of said bulging region, among the battery modules disposed in the bulging region, has a height smaller than the battery modules positioned therebehind.

* * * * *